US011914697B2

(12) United States Patent
Padinjaruveetil

(10) Patent No.: US 11,914,697 B2
(45) Date of Patent: Feb. 27, 2024

(54) SYSTEM AND METHOD FOR A TRUSTED DIGITAL IDENTITY PLATFORM

(71) Applicant: The Auto Club Group, Dearborn, MI (US)

(72) Inventor: Gopal Padinjaruveetil, Bloomfield Hills, MI (US)

(73) Assignee: THE AUTO CLUB GROUP, Dearborn, MI (US)

( * ) Notice: Subject to any disclaimer, the term of this patent is extended or adjusted under 35 U.S.C. 154(b) by 177 days.

(21) Appl. No.: 17/305,782

(22) Filed: Jul. 14, 2021

(65) Prior Publication Data

US 2023/0020703 A1 Jan. 19, 2023

(51) Int. Cl.
| | | |
|---|---|---|
| *G06F 21/31* | (2013.01) | |
| *H04L 9/32* | (2006.01) | |
| *G06F 21/45* | (2013.01) | |
| *G06F 21/62* | (2013.01) | |
| *H04L 9/40* | (2022.01) | |
| *G06K 7/14* | (2006.01) | |
| *H04L 9/00* | (2022.01) | |

(52) U.S. Cl.
CPC ............. *G06F 21/45* (2013.01); *G06F 21/31* (2013.01); *G06F 21/6245* (2013.01); *G06K 7/1417* (2013.01); *H04L 9/3213* (2013.01); *H04L 63/0884* (2013.01); *H04L 9/50* (2022.05)

(58) Field of Classification Search
CPC ...... G06F 21/45; G06F 21/31; G06F 21/6245; G06K 7/1417; H04L 9/3213; H04L 63/0884; H04L 9/50; H04L 2209/80; H04L 9/3226; H04L 9/3247
See application file for complete search history.

(56) References Cited

U.S. PATENT DOCUMENTS 11,507,943 B1 * 11/2022 Ashley ................... G06Q 20/36
2011/0126290 A1 5/2011 Krishnamurthy et al.
(Continued)

FOREIGN PATENT DOCUMENTS

CN 108805730 A 11/2018

OTHER PUBLICATIONS

International Search Report of PCT/US2022/037121 dated Oct. 26, 2022, 3 pages.
(Continued)

*Primary Examiner* — Izunna Okeke
(74) *Attorney, Agent, or Firm* — Brooks Kushman P.C.

(57) ABSTRACT

A system and method is disclosed for a digital identity (DI) management platform. A carbon identification may be generated to include personal information unique to a user. The personal information may be authenticated by an external entity (e.g., governmental agency) to the digital identity management platform. A silicon identification may be generated for multiple devices registered to the user and may include a unique identifier for each device. A digital identity may be generated that links the carbon identification and the silicon identification. The digital identity may be stored within a digital wallet accessible on each device by a user profile created and secured using a blockchain process. A request to access the personal information stored within the digital identity may be received and a predefined trust level will determine the amount of personal information to be provided.

18 Claims, 8 Drawing Sheets

(56) References Cited

U.S. PATENT DOCUMENTS

| | | |
|---|---|---|
| 2017/0243208 A1* | 8/2017 | Kurian ................. G06Q 20/322 |
| 2018/0219681 A1 | 8/2018 | Geiman et al. |
| 2018/0294966 A1 | 10/2018 | Hyun et al. |
| 2019/0222567 A1 | 7/2019 | Caldera et al. |
| 2020/0082470 A1 | 3/2020 | Sharma |
| 2021/0014218 A1 | 1/2021 | Kurylko et al. |

OTHER PUBLICATIONS

Written Opinion of PCT/US2022/037121 dated Oct. 26, 2022, 3 pages.

* cited by examiner

SYSTEM AND METHOD FOR A TRUSTED DIGITAL IDENTITY PLATFORM

TECHNICAL FIELD

A method and system are disclosed for providing a digital identity management platform for authenticating and generating a digital identity that includes a carbon identification having personal information unique to a user and silicon identification unique to a device registered to the user.

BACKGROUND

Validating information about a user's identity has potential privacy risks and weaknesses. For instance, the increase in security breaches makes it possible for malefactors to gain unauthorized access to personally identifiable information (PII) about a user, such as social security numbers (SSN), credit card numbers, insurance card numbers, driver licenses numbers, medical records, bank account numbers, online passwords, etc. Security breaches resulting in leaks of PII and data are a growing concern due to the increased local regulations (e.g., California Consumer Privacy Act (CCPA) and Global Data Privacy Act (GDPR)) and the potential costs to a user that is a victim of the fraud. For a typical user, this may requires maintaining separate credentials and passwords for online accounts relating to various institutions (e.g., banks, insurance companies, hospital records, retail institutions like Amazon.com, etc.)

SUMMARY

A system and method is disclosed for a digital identity (DI) management platform. A carbon identification may be generated to include personal information unique to a user. The personal information may be authenticated by an external entity (e.g., governmental agency, health care provider) to the digital identity management platform. A silicon identification may be generated for multiple devices registered to the user and may include a unique identifier for each device. A digital identity may be generated that links the carbon identification and the silicon identification The digital identity may be stored within a digital wallet accessible on each device by a user profile created and secured using a blockchain process. A request to access the personal information stored within the digital identity may be received and a predefined trust level will determine the amount of personal information to be provided.

It is contemplated that prior to receiving the request, the amount of personal information allowed to be provided for the trust level may be predefined. It is also contemplated that only the amount of the personal information that is allowed based on the trust level will be displayed on the devices. The at least one identifier may be a hardware identification (e.g., hardware ID, Device ID, or UDID) unique to the device. Or, the identifier may be a software identification (e.g., hash, encrypted key) unique to the one or more devices.

The DI management platform may also be operable to register a device by creating a user profile using one or more identifiers unique to a user and the device. The registration process may also invoke a registration application programming interface (API) to provide the one or more unique identifiers for creating the user profile. An SMS message may then be transmitted to the device that the user profile was created thereby completing the registration process.

The DI management platform may also onboard the device by generating a private key and public key unique to the device. A device token and the public key may also be transmitted to a trusted-key backend that pairs the public key with the device. It is also contemplated that the DI management platform may issue a digital identity that includes an attestation for the user profile using a blockchain attestation process. It is contemplated the attestation may include personal information unique to the user. The digital identity may be generated using the device token and the public key that is paired with the device. The digital identity may also be stored within a digital wallet on the device. It is contemplated that the trusted-key backend may be invoked to sign and issue the attestations.

The distributed trust network may also receive a request from a third-party for access to the attestations stored within the digital identity. The request may be initiated by requesting a third-party to generate a machine-readable code (e.g., quick-response or "QR" code) using a relying party backend service that is an edge-based platform. The device may receive and approve the machine-readable code. Once approved, the attestations may be sent to the trusted-key backend and a relying party backend service may be invoked to present the attestation to the third-party.

DETAILED DESCRIPTION

Figure 1B:
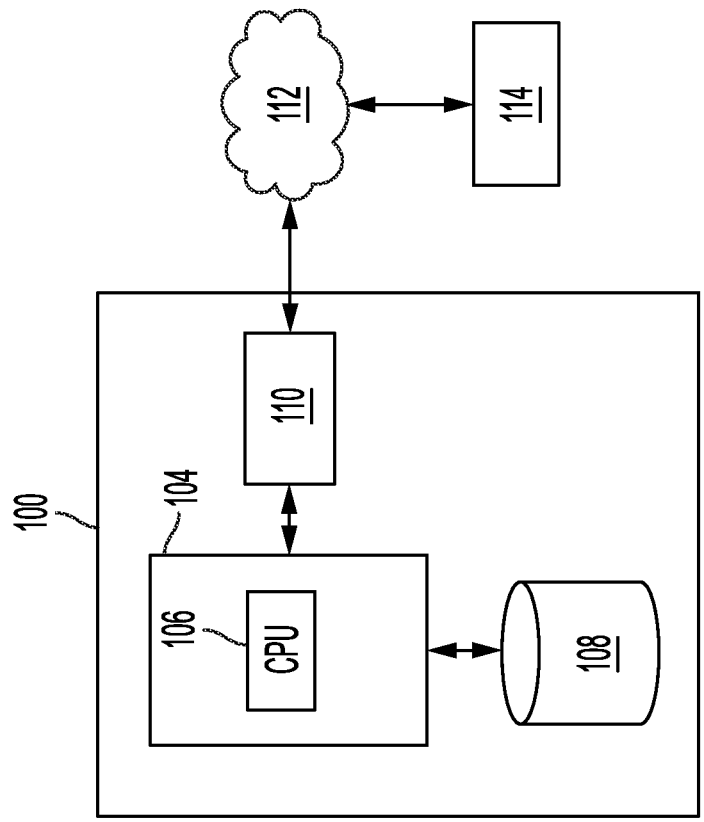
FIG. 1B illustrates exemplary components that may be included within the mobile device.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Today, a user's personal information (PI) is required to be provided for activities that may include opening new accounts, accessing new/existing accounts, or verifying a user's credentials. It is contemplated that this PI may be a user's "carbon identification" as it is verified and authenticated (e.g., by a person or government agency) and may be used by a user to access services. For instance, when opening a new account with an insurance company a user may be required to provide PI that includes Social Security number (SSN), birth record, driver license, and medical records. Similarly, a user refinancing a home loan with a bank may be required to provide carbon identification that includes a SSN, bank account, and/or driver license.

In both instances, a user is required to provide carbon identification prior to receiving a given service. For each type of carbon identification it is contemplated that authentication and verification would have previously been performed by a person, company, government agency. For instance, SSN and driver's licenses are carbon identifications that have been verified and authenticated by local or federal government agencies (e.g., Secretary of State). A user's birth record may have been verified and authenticated by a hospital and also government agency. And, medical records may have been authenticated and verified by the user's medical provider. The user may provide each of these forms of carbon identification to the requester (e.g., insurance company or refinancing company) prior to receiving a given service.

It is also contemplated each carbon identification may require multiple layers of authentication and verification. For instance, acquiring government issued documents (e.g., a new driver's license or passport from the Secretary of State) may require a user to provide a birth certificate and SSN. As previously explained, the birth certificate and SSN are additional forms of carbon identification that would have been previously verified and authenticated by other people, companies, or government agencies.

A user may also want to control the level of trust of carbon identification provided for receiving a service. For insurance coverage, a user may understand and be willing to provide very personal carbon identification (e.g., passport, medical records, SSN) to receiver the requested service. However, a user wishing to gain access to a local bar or pub, may not want to provide as much information because there is a lower level of trust. Here, the user may only want to provide carbon identification that authenticates and verifies their age to gain access. However, current forms of carbon identification (e.g., passport and driver's license) that are used to gain access to bars may include additional information beyond age verification. It would therefore be desirable that a user can control the amount of carbon identification and information being provided based on the level of trust for the service requested.

The above examples illustrate that a user's PI (that is provided by the carbon identification) may be required for authorization and access purposes. By continually providing their PI on a routine basis, a user's digital footprint is ever expanding, and their PI may be stored and transmitted between various computing databases. But as privacy concerns increase due to regulatory scrutiny (e.g., CCPA and GDPR) or as a result of data breaches, a secure digital identity (DI) management platform that provides a single digital identity for a user may be desirable. Such a DI management platform would be operable to securely store a user's carbon identification within a secure digital location. The DI management platform would then allow varying levels of access to the carbon identification by a requesting party (e.g., a bank) based on both need and permission by the user. The varying levels may not only correspond to the amount of carbon identification needed by the requesting party, but also an amount of trust a user may have with the party requesting access.

Again, gaining access to a bar typically requires only verification of a user's age. But a user will need to provide a driver's license or passport to verify their age. One issue with providing a driver's license to simply verify one's age is that additional information (e.g., Driver ID and home address) is provided even though that information is not required for access. Gaining access to the bar would therefore require a low level of access to a minimal amount of carbon identification—i.e., access to just a user's verified age. Also, a user may have a low level of trust providing information beyond their age to the bar. In this example, the DI management platform may have previously verified and stored a user's age along with additional PI based on receipt of multiple forms of carbon identification—e.g., user's driver's license, birth records, or passport. Instead of providing a carbon identification with extensive PI (i.e., driver's license or passport), the bar would only be provided access and verification of the user's age from the DI management platform. The user could then approve the request to just the information being requested—i.e., their age. The DI management platform would therefore ensure that the additional information is not accessed or compromised.

The present disclosure contemplates the secure DI management platform may operate using a digital wallet for storing and transferring a user's carbon identification. The digital wallet may securely store the carbon identification associated with a given user including SSN, driver's license records, birth certificate records, credit card information, membership information, login/passwords, and the like. The digital wallet data may reside on a mobile device, a personal computer, a server of a wallet provider, or other cloud storage. As explained further below, the digital wallet may also include a silicon identification that is unique to the given device being used. For instance, the DI management platform may store silicon identification unique to a given mobile device associated with a user. The silicon identification may include unique identifiers like an IMEI or MEID that is embedded and unique to that device.

It is also contemplated that that the DI management platform may save and associate the carbon identification with more than one digital identification. The DI management platform may authenticate, verify, and associate a user's carbon identification with numerous digital identifications authenticated, verified, and associated with a user's mobile device, person computer, vehicle infotainment system, etc. As such, the DI management platform would allow a user the ability to provide carbon identification regardless of the device. The verification and association between a user's carbon identification and silicon identification allows a user the ability to provide personal information and data without the need for re-verification and re-authentication.

It is contemplated the digital wallet may reduce the need to provide carbon identification needed for attestation when logging into a dedicated website or mobile application (i.e., app). To further secure the authentication process of the user's DI, a blockchain authentication protocol may also be employed. The blockchain authentication protocol may be used to provide attestation to a given user's identity/data between trusted partners and/or third parties. The attestation may provide secure transmission of the user's DI.

Figure 1A:
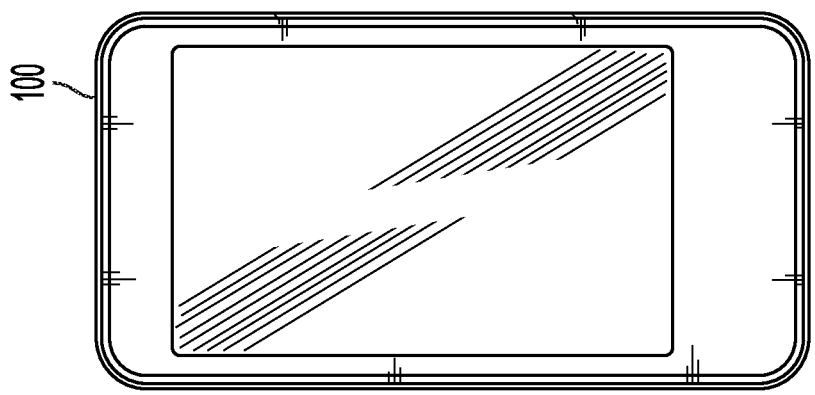
FIG. 1A is an exemplary figure of a mobile device.

FIG. 1A illustrates an exemplary mobile device 100 that may be used for the generation of a digital wallet and for implementing an authentication process using a blockchain attestation process for securely transmitting a user's DI. It is contemplated that the mobile device 100 may be a mobile phone (e.g., iPhone or Android based phone) or mobile device may be a tablet-based device (e.g., iPad). However, it is also contemplated that the mobile device may be a wearable device like a smartwatch, a user display within a vehicle, or a laptop/PC.

The mobile device 100 may include at least one processor 104 that is operatively connected to a memory unit 108. The processor 104 may be one or more integrated circuits that implement the functionality of a CPU 106 (i.e., central processing unit). The processor 104 may be a microcontroller board (e.g., Arduino microcontroller). Or, processor 104 may be a commercially available CPU that implements an instruction such as one of the x86, ARM, Power, or MIPS instruction set families.

During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The processor 104 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the mobile device 100 is deactivated or loses electrical power. The volatile memory may include static and dynamic random-access memory (RAM) that stores program instructions and data.

The mobile device 100 may include a network interface device 120 that is configured to provide communication with external systems (e.g., an institution's server or website). For example, the network interface device 110 may include a wired and/or wireless Ethernet interface as defined by Institute of Electrical and Electronics Engineers (IEEE) 802.11 family of standards. The network interface device 120 may include a cellular communication interface for communicating with a cellular network (e.g., 3G, 4G, 5G). The network interface device 120 may be further configured to provide a communication interface to an external network 112 or cloud.

The external network 112 may provide a secure connection to the world-wide web or the Internet. The external network 112 may establish a standard communication protocol between one or more external computing devices 114. The external network 112 may allow information and data to be easily exchanged between computing devices 114 and the network interface 110.

Figure 8:
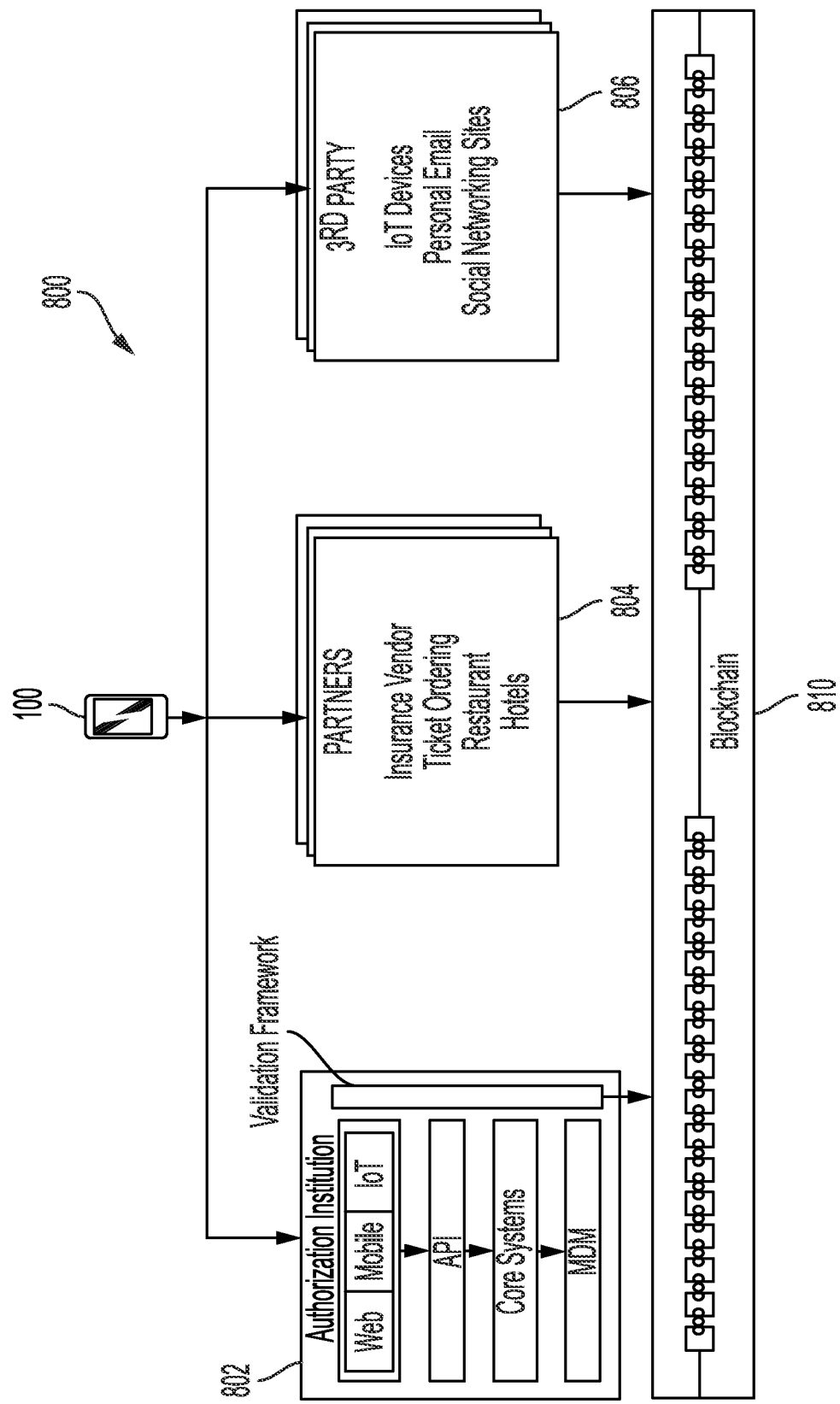
FIG. 8 is an exemplary illustration of a distributed trust network for employing the DI management platform.

FIG. 8 illustrates an exemplary distributed trust network 800 for employing the DI management platform. A registering or authorization institution 802 may be accessible by device 100 through a web browser (e.g., Google Chrome), or mobile app. It is also contemplated that institution 802 may be accessible by device 100 using an internet of things (IoT) device using IoT connection. The mobile device 100 may be used for wirelessly communicating with validation services of institution 802. The validation services may allow a user access to the institution's mobile app or website for generating and storing a digital identity (i.e., user's DI) that may include both a user's carbon identification and silicon identification. Again, the user's DI may have verified, authenticated, and registered the carbon identification with more than one silicon identification.

As illustrated, institution 802 may include one or more APIs, core systems (e.g., servers), and a member data management (MDM) that may store the user's DI. A validation framework may also allow institution 802 the ability to communicate with various partner institutions 804 (e.g., pizza shops, insurance vendors, restaurants, hotels, or banking institutions) or third party services 806 (e.g., IoT devices like Amazon Alexa or Google Home, personal email like Gmail, or social networking sites like Facebook). The DI management platform may also implement a blockchain 810 distributed ledger technology (DLT) for secure attestation of a user's DI that is transmitted between institution 802, partner institutions 804, or third party services 806.

FIGS. 2-5 are various flow diagrams 200-500 of the DI management platform illustrating how a user may be granted mobile app/website access to institution 802. FIGS. 2-5 also illustrate how credentials may be registered, a user may be onboarded to the DI management platform, a user DI may be issued, and how a secure session for accessing the stored digital identity may be processed.

It is contemplated that the onboarding process may generally be operable to pair a given digital device (e.g., mobile device 100) having a silicon identification with carbon identification unique to the user. The issuance process may be operable to provide the user DI when executed on a mobile app, website, or software of a digital device (device 100) where the silicon identification has also been authenticated and verified. The carbon identification again may include PI (or other information) about a user. For example, the PI may include birth records, passwords, usernames, credentials from government issued IDs (e.g., driver license or passport). The user DI may also comprise silicon identification unique to the device 100 like IMEI/MEID, ICCID, serial numbers, or the like. The secure session may also be initiated using a validation framework (e.g., OpenText) once the user has been issued a digital identity (e.g., using a secure digital wallet). A secure session may be needed to be initiated before the onboarding and issuance of the user is completed.

Figure 2:
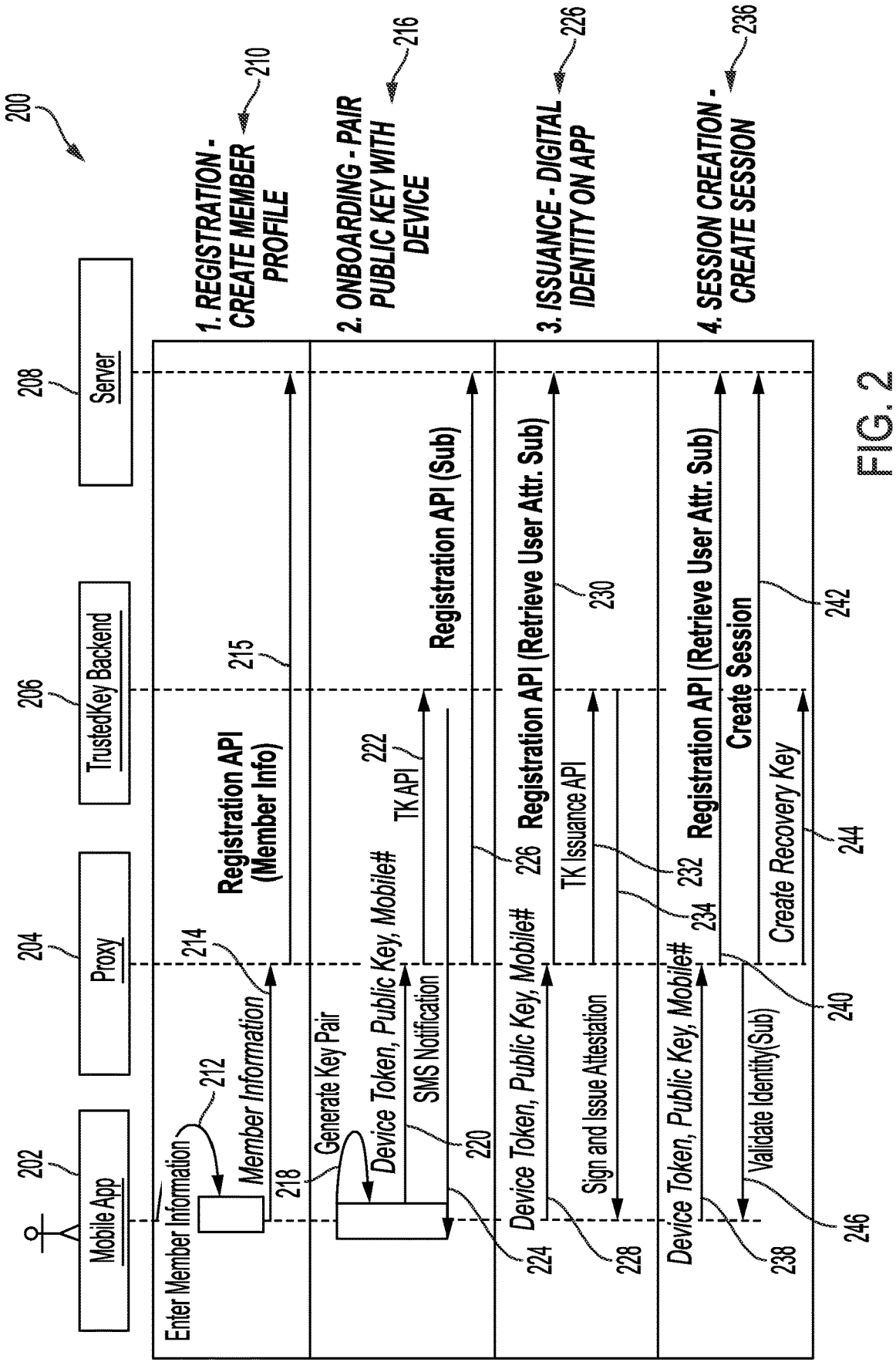
FIG. 2 is an exemplary flow diagram for registering and authentication of a new user.
Figure 3:
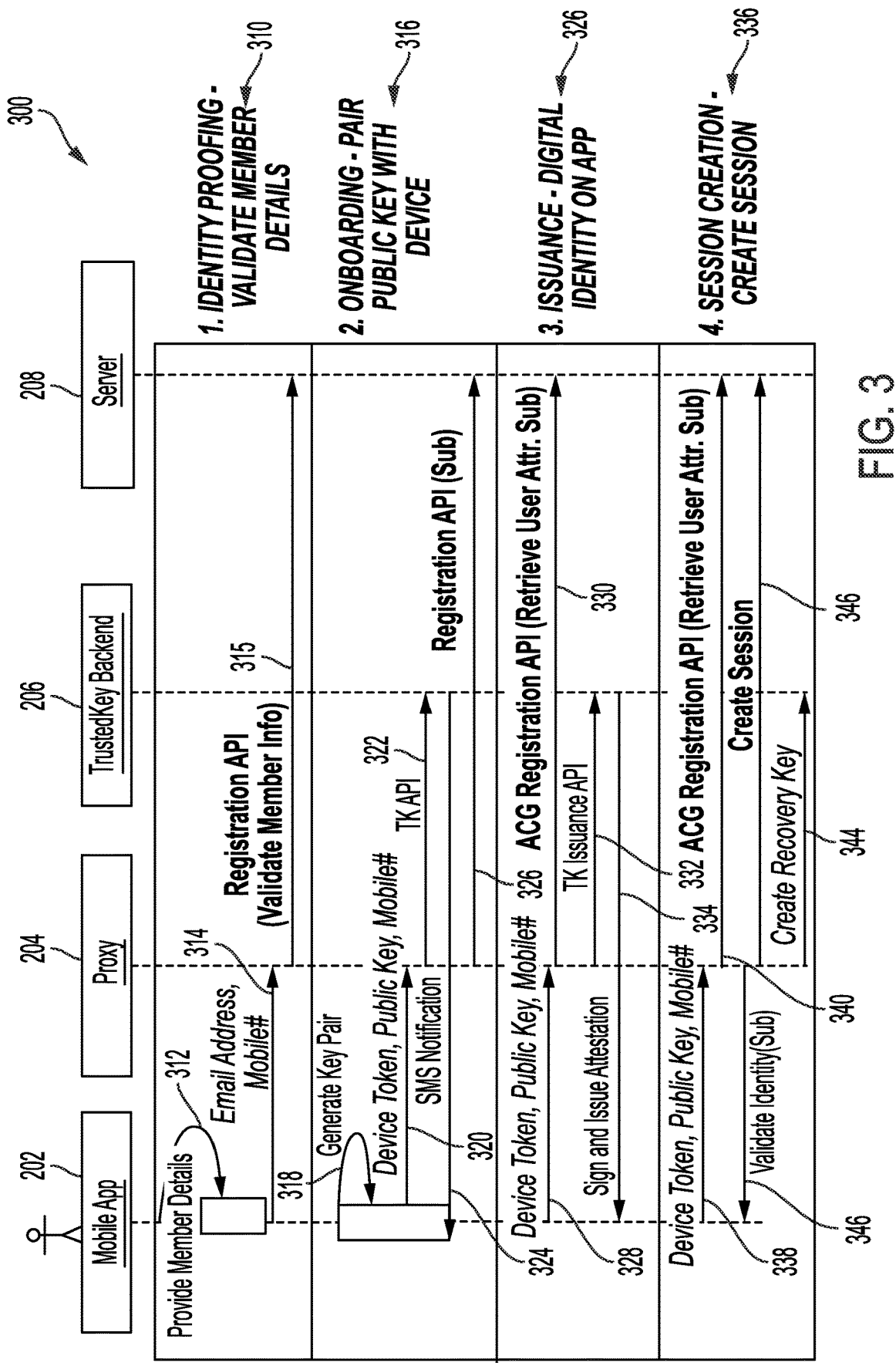
FIG. 3 is an exemplary flow diagram for authenticating a new user of a mobile app.
Figure 4:
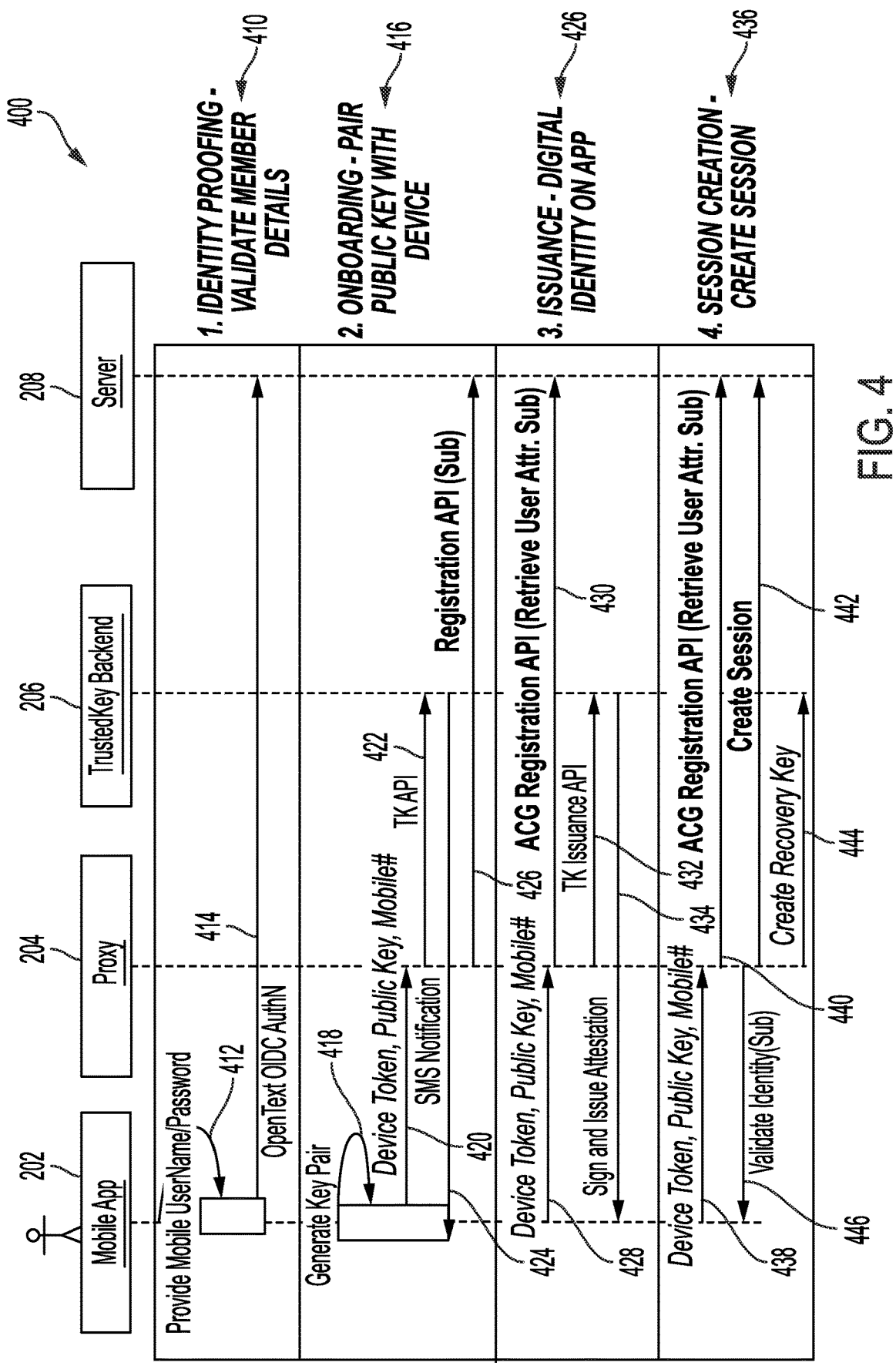
FIG. 4 is an exemplary flow diagram for a previously authenticated user of the mobile app.
Figure 5:
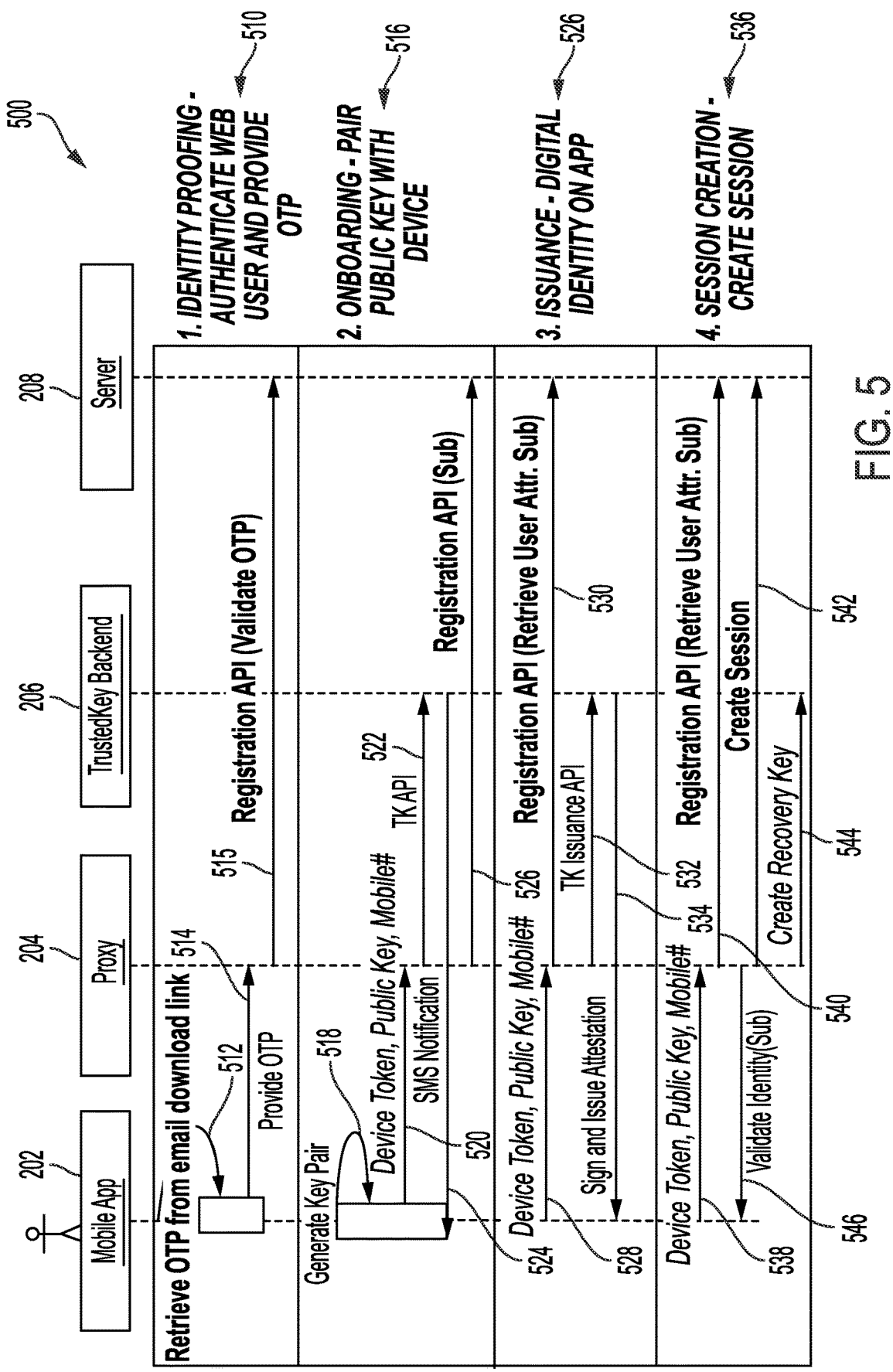
FIG. 5 is an exemplary flow diagram for a user that may be authenticated using an institution's website and is requesting authentication for using the mobile app.

FIG. 2 illustrates the flow diagram 200 for how a new user may complete the registration, onboarding, and issuance process. Flow diagram 200 may begin with the user downloading a mobile app 202 onto the mobile device 100. The mobile app 202 may be downloaded, for example, using the network interface device 120. The user may also download the mobile app 202 using one or more known app stores (e.g., Apple or Android stores) or the user may receive the mobile app 202 from a secure server hosted by an institution.

Flow diagram 200 may then proceed to a registration process 210 (i.e., or identity proofing) where a user's member profile may be created. The registration process 210 may be initiated upon the mobile app 202 when a user clicks on a "sign up" or "new user" link. At step 212 the user may then be prompted and be required to enter in member (user) information that includes the phone number of the mobile device 100, the user's zip code, the user's credit card information, or user details regarding membership to an institution's service (e.g., user insurance membership ID).

At step 214, the mobile app 202 may then invoke a proxy 204 and provide the member information. At step 215, the proxy 204 may invoke a registration application programming interface (API) with server 208 to provide the member information for creating a member profile. Server 208 may return a verification message to the mobile app 202. For instance, server 208 may provide a SMS message indicating that the member profile was successfully created. It is contemplated that server 208 may be hosted by institution 802.

Flow diagram 200 may then proceed to the onboarding process 218 to pair a public key with the mobile device 100. The onboarding process 218 may also be used to confirm the verification code using the mobile app 202. At step 216, a unique public key may be paired with the mobile device 100. Process 218 may begin at step 216 where a private and public key pair may be generated within the mobile app 202. At step 218 the mobile app 202 may invoke proxy 204 and provide a device token, public key and the phone number of the mobile device 100.

At step 220 and 222, the proxy 204 may then invoke a trusted-key backend 206 using a token (TK) API to pair the public key with the mobile device 100 and a corresponding short message service (SMS) verification to deliver the public key to the phone (i.e., step 222). It is contemplated the SMS verification process may be used to build the trust association with the trusted-key backend 206. By assigning a device 100 to a specific user (i.e., member) a three-way trust may be established between the member, the device 100 and the institution 802.

At step 224, the proxy 204 may invoke a registration API to populate subscription information with the public key and the member (user) identification and both may be saved within the member profile on server 208. Upon successfully, saving the public key and member ID within the member profile the mobile app 202 may receive a SMS message with a verification code. The verification code may be used to confirm authorization of the email address for usage by the digital wallet.

Flow diagram 200 may then proceed to the issuance process 226 where the user DI using a blockchain attestation process is issued for use by a registered member of the mobile app 202. The DI may be stored within the digital wallet and may only be transmitted by an authorized user.

The issuance process 226 may begin with the user establishing a personal identification number (PIN) or security code. For instance, a 6-digit PIN may be required to protect the mobile app 202 from being used by non-registered and onboarded users. At step 228, the mobile app 202 may then invoke the proxy 204 using the device token, public key, and the phone number of the mobile device 100. At step 230 the proxy 204 may invoke a Get Consumer API using the validation framework to retrieve one or more attributes stored on server 208 for the requesting member (user) and the Sub (which includes the public key and clientID). At step 232, the proxy 204 may invoke the trusted-key backend 206 using a token (TK) Issuance API to sign and issue the attestation for storage within the digital wallet of the mobile app 202. At step 234 the trusted-key backend 206 may transmit a push notification with the signed digital identity to a digital wallet stored on mobile device 100.

The proxy 204 may also transmit a signal to the mobile app 202 that a valid DI has been issued and stored within the digital wallet thereby permitting a session creation process 236 to be initiated. The session creation process 236 may also be required to complete the onboarding process 218 and issuance process 226.

The session creation process 236 may begin at step 238 where the mobile device invokes the proxy 204 to create a session by providing the device token, public key and phone number of the mobile device 100. At step 240, the proxy 204 using an OpenID Connect (OIDC) client session may integrate with an OIDC server to validate the Sub with the mobile app 202 and the user identity. It is contemplated the OIDC client/server may be an authentication layer that is part of the validation framework. At step 242 the proxy 204 may create a member (user) session with server 208. At step 244, the proxy 204 may also invoke the trusted-key backend 206 to create a recovery key unique to the mobile app 202. And at step 246, the proxy 204 transmits a validation (success) message to the mobile app 202 that validates the user as being authorized to access features within the mobile app 202.

Flow diagram 300 is an alternative embodiment where a user may have an existing membership with a given institution. It is contemplated that flow diagram 300 may be initiated when a user has not signed into an institution's website or using the mobile app 202. It is also contemplated that flow diagram 300 may be initiated when an institution does not have login credentials (i.e., username/password).

Again, flow diagram 300 may begin with a mobile app 202 being downloaded onto the mobile device 100. It is contemplated that a user may receive an email from the institution with a link for downloading the mobile app 202. When the user clicks the link within the email, the mobile app 202 may be downloaded from an app store (e.g., Apple or Android app store).

Once downloaded, the mobile app 202 may provide a "sign up as new user" link. Upon clicking on the link, flow diagram 300 may begin with an identity proofing process 310 to validate an existing member's details. Unlike flow diagram 200, since the user may have an existing membership with a given institution, a registration process (i.e., registration process 200) may not be required. Process 310 may begin at step 312 where the user is prompted to provide member information (details) that includes institution plan details (e.g., insurance plan details), credit card details, user's zip code, or the phone number of the mobile device 100, or the like. At step 314, the mobile app 202 may invoke proxy 204 with one or more pieces of the member information. At step 315, the proxy 204 may invoke a registration API to validate the user profile based on the member information currently stored on server 208. If the member information is validated based on previously stored member information, the user identity of mobile app 202 is verified.

Flow diagram 300 may then proceed to execute the onboarding process 318, issuance process 326, and session creation process 336. It is contemplated that the onboarding process 318 and steps 316-324 may be executed in a similar process as to process 218 and steps 216-224. The issuance process 326 and steps 328-334 may be executed in a similar process as to process 226 and steps 228-234. Lastly, the session creation process 336 and steps 338-346 may be executed in a similar process as to process 236 and steps 238-246.

Flow diagram 400 is another alternative embodiment where a user may have an existing membership with a given institution and has previously downloaded and been provided access to the mobile app 202. It is contemplated that flow diagram 300 may be initiated when a user already has a registered credentials (e.g., username/password) for accessing and signing into the mobile app 202. Flow diagram 400 may be initiated when user receives a notification (either from an App store or by email) that there exists an update for the mobile app 202. User may then initiate downloading the update for the mobile app 202 from an app store (e.g., Apple or Android app store).

Once downloaded, the mobile app 202 may provide a "sign up as an existing user" link. Upon clicking on the link, flow diagram 400 may begin with an identity proofing process 410 (i.e., authentication). Unlike flow diagram 200, since the user may have an existing membership with a given institution and has already registered and signed into the mobile app 202, a registration process (i.e., registration process 200) may not be required. Instead, flow diagram 400 may include an identity proofing process 410 that may be used to authenticate the previously registered user of the mobile app 202.

Process 410 may begin at step 412 where the user is prompted to provide credentials (e.g., username/password) that were previously registered and used to access the mobile app 202. At step 314, the mobile app 202 may initiate an OpenID Connect (OIDC), a layer on top of OAuth 2.0 that offers authentication protocol used as a validation protocol to verify the provided credentials with those that were previously registered and stored on server 208. Stated differently, the OIDC may be the protocol that is used to authenticate a user of a given device 100. For instance, when a user enters their user name and password using the device 100, the OIDC layer may receive those credentials and check them against the registered data stored on server 208 for validation.

If the user's credentials are verified as being authentic, the mobile app 202 may provide a prompt requesting whether in the future the user would like to use a passwordless access (i.e., Blockchain authentication) for the mobile app 202. It is contemplated that passwordless access may require a confirmation process using the phone number of the mobile device 100. It is also contemplated that if the user does not select passwordless access, the mobile app 202 may continue to be accessed using the registered credentials and process 410 may be required for authentication.

Flow diagram 400 may then proceed to execute the onboarding process 418, issuance process 426, and session creation process 436. It is contemplated that the onboarding process 418 and steps 416-424 may be executed in a similar process as to process 218 and steps 216-224. The issuance process 426 and steps 428-434 may be executed in a similar process as to process 226 and steps 228-234. Lastly, the session creation process 436 and steps 438-446 may be executed in a similar process as to process 236 and steps 238-246.

Flow diagram 500 is another alternative embodiment where a user may have an existing membership with a given institution and has accessed (i.e., logged into) the institution's website, but has not previously downloaded and been provided access to the mobile app 202. It is contemplated that flow diagram 500 may be initiated for user's that have login credentials (username/password) to access the institution's website.

It is contemplated that flow diagram 500 may be initiated when a user logs into an institution's website using registered credentials (e.g., username/password). The institution's website may then provide a link or process for allowing a user to enroll in passwordless authentication (i.e., Blockchain based authentication). Once the user clicks on the link or enrolls in passwordless authentication the user may be provided a link for downloading the mobile app 202 and a one-time passcode (OTP). Or, user may receive an email with instructions for downloading the mobile app 202 and the OTP. The generated OTP may be saved within the member profile on sever 208. User may then initiate downloading the mobile app 202 from an app store (e.g., Apple or Android app store).

Once downloaded, the mobile app 202 may provide a "sign up as an existing user" link. Upon clicking on the link, flow diagram 500 may begin with an identity proofing process 510. Unlike flow diagram 200, since the user may have an existing membership with a given institution and has already registered and signed into the institution's website, a registration process (i.e., registration process 200) may not be required. Instead, flow diagram 500 may include an identity proofing process 510 that may be used to authenticate the previously registered user that has accessed institution's website.

At step 512, the user will retrieve and enter the OTP provided by the institution and may further be required the phone number of the mobile phone 100. At step 514, the mobile app 202 may invoke the proxy 204 with the OTP. At step 515, the proxy 204 may invoke a registration API with sever 208 to validate the OTP as being authentic. If the OTP is authenticated, the mobile app 202 may be receive a SMS with a verification code. The user may authenticate the verification code received to complete the identity proofing process 510 such that the e-mail will be authenticated for the digital wallet.

Flow diagram 500 may then proceed to execute the onboarding process 518, issuance process 526, and session creation process 536. It is contemplated that the onboarding process 518 and steps 516-524 may be executed in a similar process as to process 218 and steps 216-224. The issuance process 526 and steps 528-534 may be executed in a similar process as to process 226 and steps 228-234. Lastly, the session creation process 536 and steps 538-546 may be executed in a similar process as to process 236 and steps 238-246.

It is also contemplated that a user may have an existing institution membership, login credentials and previously accessed the institution's website, or has previously accessed the mobile app 202 and been issued a digital identity stored within the digital wallet. However, the user may have misplaced or lost the mobile phone 100 previously used to access the mobile app 202. It is therefore contemplated that a recovery process may be initiated to again provide access and resave the digital identity within a newly created digital wallet.

The recovery process may begin with the user downloading the mobile app 202 onto a newly provided mobile phone 100. The mobile app 202 may then include a recovery mode option. The mobile app 202 may then request knowledge-based authentication (KBA) information from the user. For instance, the KBA information may include prestored questions or member profile information (e.g., zip code, membership number, name, etc.). The KBA information may further require the phone number of the mobile phone 100. Upon receiving the KBA information, the mobile app 202 may proceed with an onboarding process (e.g., onboarding process 218) to authenticate usage of the mobile app 202.

For instance, a unique public key may be paired with the mobile device 100. Like step 216, a private and public key pair may be generated within the mobile app 202. The mobile app 202 may invoke proxy 204 and provide the new public key (associated with the new mobile device 100), the phone number of the mobile device 100, and the KBA information. The proxy 204 may sign the new public key with a recovery key associated with member profile stored on server 208. The proxy 204 may provide the signed public key and recovery public key to the mobile app 202. The mobile app 202 may invoke the trusted-key backend 206 using a TK API with the signed payload and recovery public key. The trusted-key backend 206 may validate using the public recovery key. The trusted-key backend 206 may then pair the new public key with the mobile device 100. The trusted-key backend 206 may also invoke an API to replace the phone number of the new mobile device 100 and the newly authenticated device token mapping into the member profile saved on server 208. It is contemplated that the API may need to be invoked by the backend 206 to perform this authorization process before executing the command to change a phone number.

The recovery process may then operate similar to step 230 where the proxy 204 may invoke a Get Consumer API using the validation framework (i.e., OpenText Blockchain) to retrieve one or more attributes stored on server 208 for the requesting member (user) and the Sub (which includes the public key and clientID). The recovery process may also operate similar step 232 where the proxy 204 invokes the trusted-key backend 206 using a token (TK) Issuance API to sign and issue attestation for the mobile app. The recovery process may also operate like step 234 where the trusted-key backend 206 may transmit a push notification with the signed and attested digital identity to a digital wallet stored on mobile device 100.

The proxy 204 may transmit a signal to the mobile app 202 that a valid digital identity has been issued and stored within the digital wallet thereby permitting a session creation process (e.g., like session creation process 236) to be initiated. The session creation process may operate like step 238 where the mobile device invokes the proxy 204 to create a session by providing the device token, public key and phone number of the mobile device 100. Like step 240, the proxy 204 may use an OpenID Connect (OIDC) client session may integrate with an OIDC server to validate the Sub with the mobile app 202 and the user identity. Again, it is contemplated the OIDC client/server may be an authentication layer that is part of the validation (authorization) framework.

It is also contemplated that a user may have: (1) an existing membership with an institution; (2) has accessed and used the mobile app 202; and/or (3) has previously been issued a digital identity stored within a digital wallet. However, the user may now wish to access an institution's website using the digital identity located within the digital wallet. User may begin by clicking on a link for signing onto the institution website using the digital identity.

The institution website may then prompt the user to enter the phone number of the mobile device 100. The mobile app 202 may receive a notification for authentication of the digital identity stored within the digital wallet. For instance, the website may issue an OIDC request to the disparate systems that will be acting as a Token Relying Party Service. It is contemplated the TK Relying Party Service may include the proxy 204 and trusted backend 206 working in conjunction to issue the OIDC request. The TK Relying Party Service may locate the user's device using the phone number of the mobile device 100. The push notification may request attestation of the digital identity and a service link to retrieve the attestation. The service link may be initiated using a token (TK) Wallet Service.

For the user to authorize, the website may send the digital identity to the service link. This may be done using the TK Wallet Service. The digital identity may then be validated by verifying the signatures of the user and the issuer (i.e., the institution website). The TK Relying Party Service may then retrieve the digital identity form the service link and send an OIDC response to the website with a verification message and digital identity for the user. Once completed, the website may provide access to the institution's website by retrieving the attributes from the digital identity and authorizing user access.

Lastly, the mobile app 202 may include a time limit for logging out the user out of the mobile app 202 or the user may have explicitly logged out of the mobile app 202. However, the user may wish to re-access the mobile app 202. To re-access, the user may re-enter their PIN (e.g., 6-digit PIN) or security code. The mobile app 202 may then request the user to sign in using their stored credentials or by passwordless authentication. The mobile app 202 may then invoke the proxy 204, which in turn, invokes the trusted-key backend 206 using the TK API to retrieve the public key. The proxy 204 may also invoke the validation protocol (i.e., OpenText) using a Get Consumer API to retrieve the Sub located on server 208. Like step 240, the proxy 204 using an OpenID Connect (OIDC) client session may integrate with an OIDC server to validate the Sub with the mobile app 202 and the user identity. Once authorized, the proxy 204 may create a valid user session.

Again, FIG. 8 illustrates a distributed trust network for use of the DI management platform. Once a device 100 has registered with institution 802 (as discussed above), the device 100 may then use the digital identity stored within the digital wallet (e.g., digital wallet 610) when requested by various partner institutions 804 or third-party institutions 806. The various levels of trust required by institutions 804 or 806 may vary based on what amount of information required and what the user wishes to provide.

Figure 6:
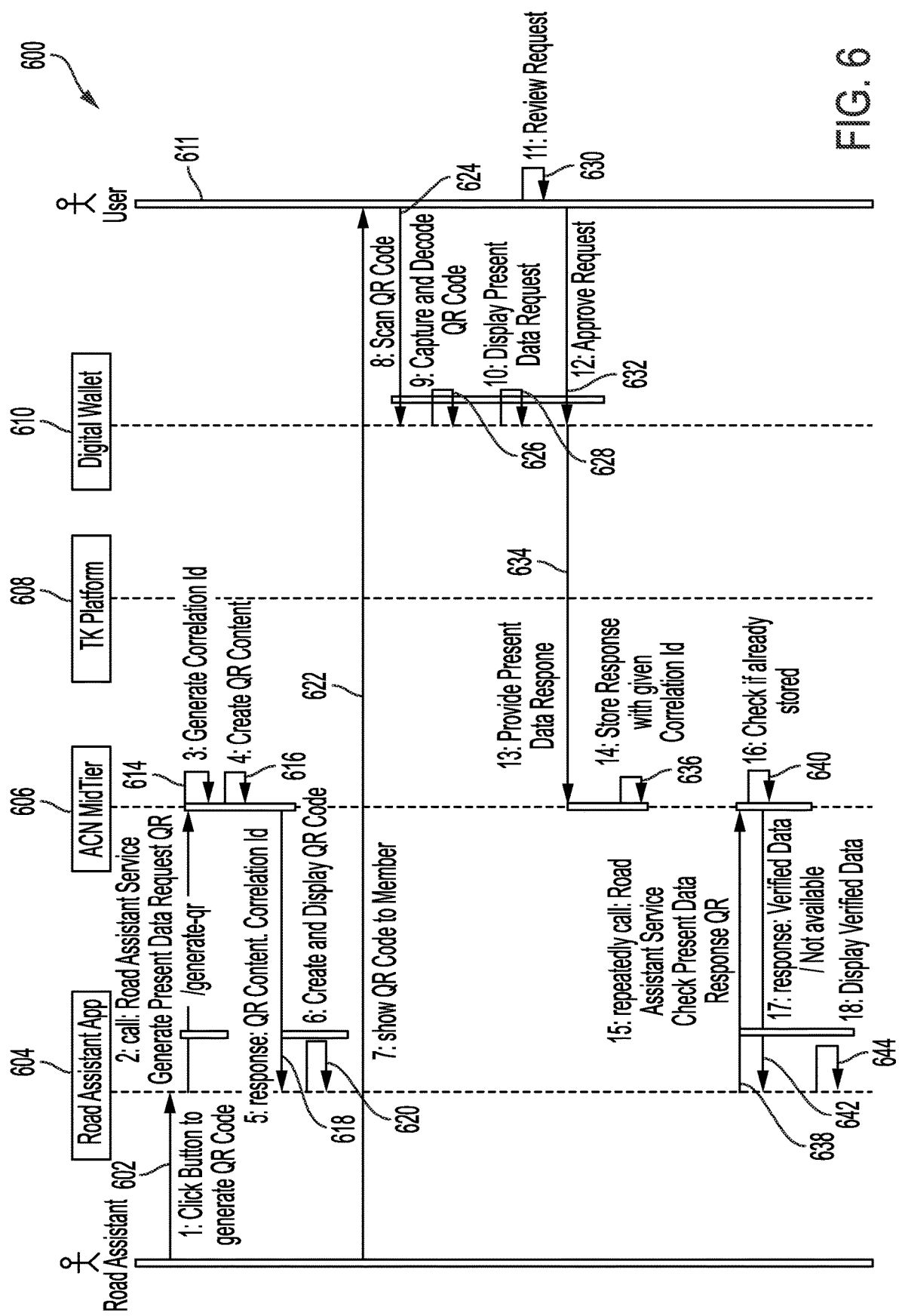
FIG. 6 is an exemplary flow diagram for how the digital attestations may be provided from a customer to requesting institution employee.

For instance, FIG. 6 illustrates a flow diagram 600 for how the mobile app 202 may use the digital identity (i.e., attestation) stored within a digital wallet 610. It is contemplated that flow diagram 600 is an exemplary scenario where the partner institution 804 may be an automobile insurance company that provides road-side service to a given customer 611 (i.e., user) whose automobile may require service. However, the flow diagram and authorization process are not limited to the example illustrated. Flow diagram 600 may similarly operate for other institutions 804 or 806 requesting access to the digital identity of the user.

Flow diagram 600 may begin at step 602 where an institution's employee (e.g., employee of the insurance company) may request a machine-readable optical code be generated using a mobile app 604. For instance, a Quick Response (QR) code may be wirelessly requested by the mobile app 604. It is contemplated that the mobile app 604 may be stored on a mobile device provided to the employee by the institution. At step 612, the mobile app 604 may wirelessly invoke an ACN Midtier Road Assistance Service 606, which is an edge-based platform, using a Generate Present Data Request to request generation of the QR code. It is contemplated service 606 may be a separate server used to generate GR codes. In the example illustrated by flow diagram 600, service 606 may be initiated by the roadside assistant as opposed to being invoked by the member. When being called by the roadside assistant, service 606 may build a QR code that can be used by the Roadside Assistant to validate the member and the server (i.e., attestation between the two).

At steps 614 and 616, service 606 may generate a correlation ID, that will be used only once, and the contents (data elements) necessary to generate a QR code. At step 618, the service 606 may transmit the QR contents and correlation ID back to the mobile app 604. At step 620, the mobile app 604 may encode and generate a QR code using the correlation ID and the QR contents.

At step 622, the mobile app 604 (i.e., by employee of institution 804 on mobile device) may present the QR code to a user 611. At step 624, the user may open mobile app 202 and the digital wallet 610 may be used to scan the QR code presented by mobile app 604. The digital wallet 610 may then be used to store the QR code. At step 628, the digital wallet 610 may then display a prompt (i.e., Present Data Request) to confirm that the user 611 wishes to present the digital identity information. At steps 630 and 632, the user 611 may review and approve the prompt request presented by the digital wallet 610. At step 634, the digital wallet 610 may wirelessly transmit the approval response to service 606. At step 636, service 606 may store the response received by digital wallet 610 along with the previously generated Correlation ID.

At Step 638, the mobile app 604 may be continuously requesting a response from service 606 as to whether the response had been received from digital wallet 610. It is contemplated that step 638 may be continuously occurring during steps 624-636. At step 642, service 606 may transmit whether the response from digital wallet 610 has not been received (i.e., steps 624-636 not yet complete) or response from digital wallet 610 has been received. At step 644, mobile app 604 confirms the digital attestation (i.e., response) has been received. Upon receipt of the digital attestation, the institution employee will have necessary information regarding customer (i.e., member profile information) that may include credit card information, member profile ID, type of insurance.

It is further contemplated that alternative methods may be used for requesting and approving access to the user's DI. For instance, the employee of institution 804 may request user 611 provide a phone number. The phone number may be used to invoke the request of information from the digital wallet 610. User 611 may approve the request (as described above) and upon receipt of the digital attestation, the institution employee will have necessary information regarding customer (i.e., member profile information) that may include credit card information, member profile ID, type of insurance. Again, by having varying levels of trust, only the information necessary by a given partner institution 804 or third-party institution 806 is provided.

Figure 7:
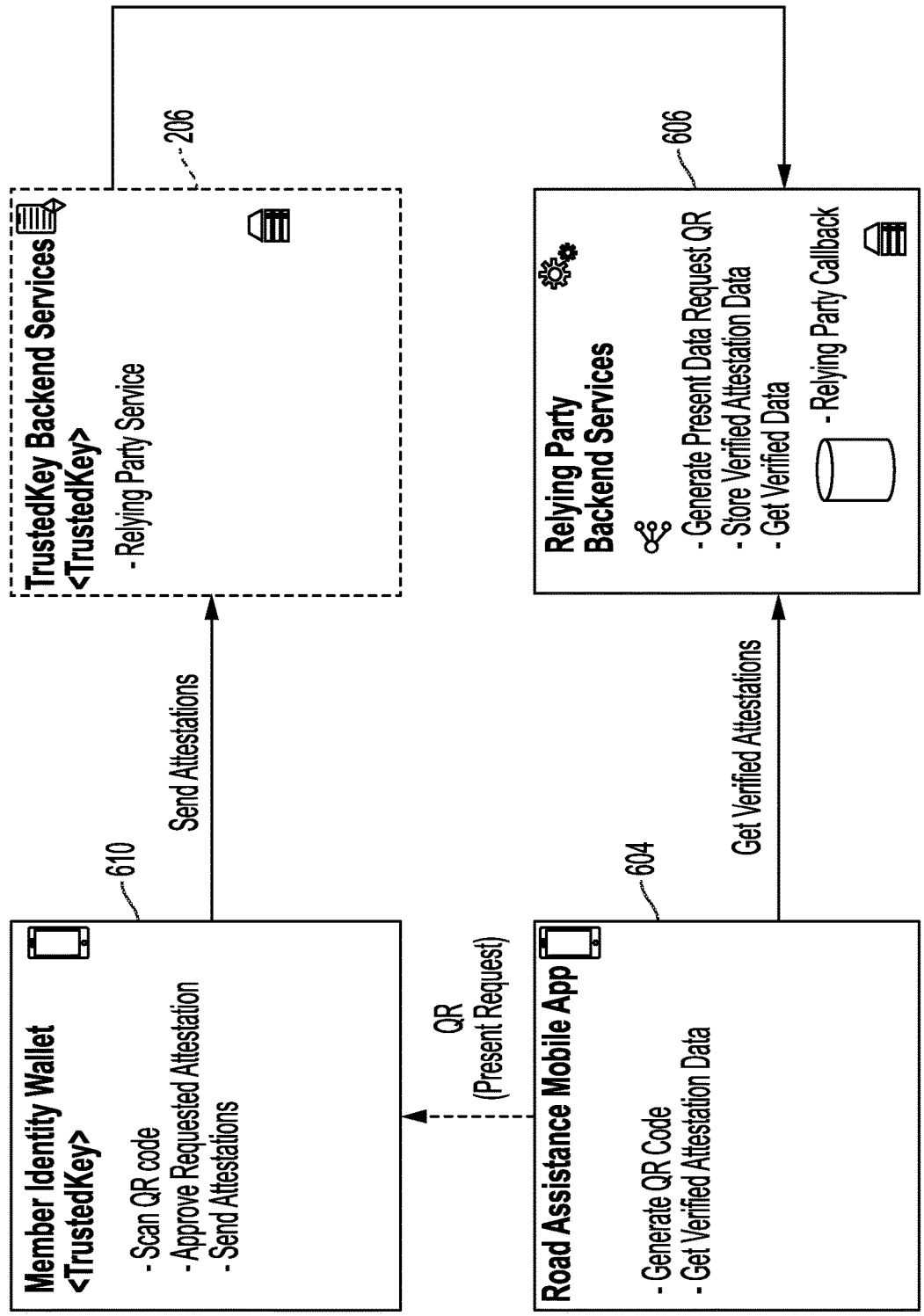
FIG. 7 is an alternative flow diagram for how the digital attestations may be provided from a customer to requesting institution employee.

FIG. 7 illustrates an alternative flow diagram 700 for the process described by flow diagram 600. Again, the process may begin when mobile app 604 requests from Relying Party Backend Services 606 that a QR code be generated. An institution's employee may use mobile app 604 to generate and present a QR code to digital wallet 610 within mobile app 202. Again, the digital wallet 610 may scan the QR code and approve the attestations being requested by mobile app 604. The digital wallet may then invoke the trusted-key backend 206 with the requested attestations stored within the digital wallet 610. The backend 206 may then invoke the Relying Party Backend Service 606 with the requested attestations and response. Service 606 may store the attestation data and present the verified attestations to mobile app 604.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of providing a digital identity management platform, comprising:
generating a carbon identification that includes personal information unique to a user, wherein the personal information is authenticated by an entity external to the digital identity management platform;
generating a silicon identification for one or more devices registered to the user, the silicon identification including at least one identifier unique to the one or more devices; and
generating a digital identity that links the carbon identification and the silicon identification,
creating a user profile for the digital identity, the user profile including an attestation that is created using a blockchain process, the digital identity being stored within a digital wallet accessible on the one or more devices using the user profile;
receiving from the one or more devices a request to access the personal information stored within the digital identity, wherein a trust level associated with the request determines an amount of the personal information to be provided;
onboarding the one or more devices by generating a private key and public key unique to the one or more devices, wherein a device token and the public key are transmitted to a trusted-key backend that pairs the public key with the one or more devices; and
issuing the digital identity to includes the attestation for the user profile using the blockchain process, wherein the digital identity is generated using the device token and the public key that is paired with the one or more devices, and wherein the digital identity is stored within the digital wallet on the one or more devices.

2. The method of claim 1, wherein prior to receiving the request, the amount of the personal information allowed to be provided for the trust level is predefined.

3. The method of claim 1, further comprising: displaying on the one or more devices only the amount of the personal information that is allowed based on the trust level.

4. The method of claim 1, wherein the at least one identifier is a hardware identification unique to the one or more devices.

5. The method of claim 1, wherein the at least one identifier is a software identification unique to the one or more devices.

6. The method of claim 1, wherein the personal information includes one or more documents issued by a government entity.

7. The method of claim 1, wherein the personal information includes one or more medical records issued by a health care provider.

8. The method of claim 1, further comprising: receiving the request from a third-party for access to the attestation stored within the digital identity.

9. The method of claim 1, wherein receiving the request from the third-party further compromises:
sending a second request that a machine-readable code be generated;
receiving and approving the machine-readable code;
sending the attestation to the trusted-key backend; and
invoking a relying party backend service to present the attestation to the third-party.

10. The method of claim 9, wherein the machine-readable code is a quick response code.

11. The method of claim 10, wherein the relying party backend service is an edge-based platform that generates using a generate present data request.

12. The method of claim 1, further comprising:
invoking a registration application programming interface to provide one or more unique identifiers for creating the user profile; and
transmitting an SMS message to the one or more devices that the user profile was created.

13. A system for providing a digital identity management platform, comprising:
   a processor operable to:
      generate a carbon identification that includes personal information unique to a user, wherein the personal information is authenticated by an entity external to the digital identity management platform;
      generate a silicon identification for one or more devices registered to the user, the silicon identification including at least one identifier unique to the one or more devices; and
      generate a digital identity that links the carbon identification and the silicon identification,
      create a user profile for the digital identity, the user profile including an attestation that is created using a blockchain process, the digital identity being stored within a digital wallet accessible on the one or more devices using the user profile; and
      receive from the one or more devices a request to access the personal information stored within the digital identity, wherein a trust level associated with the request determines an amount of the personal information to be provided;
   onboard the one or more devices by generating a private key and public key unique to the one or more devices, wherein a device token and the public key are transmitted to a trusted-key backend that pairs the public key with the one or more devices; and
      issue the digital identity to include the attestation for the user profile using the blockchain process, wherein the digital identity is generated using the device token and the public key that is paired with the one or more devices, and wherein the digital identity is stored within the digital wallet on the one or more devices.

14. The system of claim 13, wherein the processor is further operable to: display on the one or more devices only the amount of the personal information that is allowed based on the trust level.

15. The system of claim 13, wherein a verification code is used to confirm authorization of an email address for usage with the digital wallet.

16. The system of claim 13, wherein a personal identification number is established and permits access to the digital wallet.

17. The system of claim 13, wherein the trusted-key backend is invoked to sign and issue the attestation.

18. A method of providing a digital identity management platform, comprising:
   generating a carbon identification that includes personal information unique to a user, wherein the personal information is authenticated by an entity external to the digital identity management platform;
   generating a silicon identification for one or more devices registered to the user, the silicon identification including at least one identifier unique to the one or more devices; and
   generating a digital identity that links the carbon identification and the silicon identification,
   creating a user profile for the digital identity, the user profile including an attestation that is created using a blockchain process, the digital identity being stored within a digital wallet accessible on the one or more devices using the user profile;
   receiving from the one or more devices a request to access the personal information stored within the digital identity, wherein a trust level associated with the request determines an amount of the personal information to be provided;
   invoking a registration application programming interface to provide one or more unique identifiers for creating the user profile; and
   transmitting an SMS message to the one or more devices that the user profile was created.

\* \* \* \* \*